(12) United States Patent
Kajarekar et al.

(10) Patent No.: US 9,165,182 B2
(45) Date of Patent: Oct. 20, 2015

(54) METHOD AND APPARATUS FOR USING FACE DETECTION INFORMATION TO IMPROVE SPEAKER SEGMENTATION

(71) Applicant: Cisco Technology, Inc., San Jose, CA (US)

(72) Inventors: Sachin S. Kajarekar, Sunnyvale, CA (US); Mainak Sen, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 164 days.

(21) Appl. No.: 13/969,914

(22) Filed: Aug. 19, 2013

(65) Prior Publication Data

US 2015/0049247 A1     Feb. 19, 2015

(51) Int. Cl.
*G06K 9/00* (2006.01)
*H04S 7/00* (2006.01)
*H04N 7/14* (2006.01)

(52) U.S. Cl.
CPC ............ *G06K 9/00228* (2013.01); *H04N 7/147* (2013.01); *H04S 7/303* (2013.01)

(58) Field of Classification Search
CPC ....... G06K 9/00228; H04N 5/60; H04S 7/303
USPC ................... 348/14.08, 484, 700, 169, 222.1; 375/240.16; 382/118, 115, 190, 224; 704/246, 270, 231, 233, 259; 715/811; 700/94
See application file for complete search history.

(56) References Cited

U.S. PATENT DOCUMENTS

| | | | |
|---|---|---|---|
| 6,219,640 B1 * | 4/2001 | Basu et al. ................... | 704/246 |
| 6,567,775 B1 * | 5/2003 | Maali et al. .................. | 704/231 |
| 6,964,023 B2 * | 11/2005 | Maes et al. ................... | 715/811 |
| 7,164,718 B2 * | 1/2007 | Maziere et al. .......... | 375/240.16 |
| 7,219,062 B2 * | 5/2007 | Colmenarez et al. ......... | 704/270 |
| 7,343,289 B2 * | 3/2008 | Cutler et al. ................. | 704/259 |
| 7,564,994 B1 * | 7/2009 | Steinberg et al. ............. | 382/118 |
| 7,692,685 B2 * | 4/2010 | Beal et al. .................... | 348/169 |
| 7,706,576 B1 * | 4/2010 | Beck et al. ................... | 382/118 |
| 7,715,597 B2 * | 5/2010 | Costache et al. ............. | 382/118 |
| RE42,977 E * | 11/2011 | Maziere et al. .......... | 375/240.16 |
| 8,050,466 B2 * | 11/2011 | Corcoran et al. ............. | 382/118 |
| 8,169,463 B2 | 5/2012 | Enstad et al. | |
| 8,189,927 B2 * | 5/2012 | Steinberg et al. ............. | 382/224 |
| 8,306,824 B2 * | 11/2012 | Park .............................. | 704/270 |
| 8,363,952 B2 * | 1/2013 | Bigioi et al. .................. | 382/190 |
| 8,553,949 B2 * | 10/2013 | Steinberg et al. ............. | 382/118 |

(Continued)

FOREIGN PATENT DOCUMENTS

WO     WO0016243  A1     3/2000

OTHER PUBLICATIONS

Lagrange et al.; Speaker Segmentation of Interviews Using Integrated Video and Audio Change Detectors; CBMI '07; Jun. 25-27, 2007; ISBN 1-4244-1011-8.

(Continued)

*Primary Examiner* — Gerald Gauthier
(74) *Attorney, Agent, or Firm* — P. Su (57) ABSTRACT

In one embodiment, a method includes obtaining media that includes a video stream and an audio stream. The method also includes detecting a number of faces visible in the video stream, and performing a speaker segmentation on the media. Performing the speaker segmentation on the media includes utilizing the number of faces visible in the video stream to augment the speaker segmentation.

17 Claims, 5 Drawing Sheets

(56) References Cited

U.S. PATENT DOCUMENTS

| | | | |
|---|---|---|---|
| 8,660,842 B2* | 2/2014 | Raux | 704/233 |
| 8,687,078 B2* | 4/2014 | Bigioi et al. | 348/222.1 |
| 8,879,799 B2* | 11/2014 | Song et al. | 382/115 |
| 2013/0144414 A1 | 6/2013 | Kajarekar et al. | |
| 2013/0162752 A1* | 6/2013 | Herz et al. | 348/14.08 |
| 2013/0300939 A1* | 11/2013 | Chou et al. | 348/700 |
| 2014/0340467 A1* | 11/2014 | Kajarekar et al. | 348/14.08 |
| 2015/0049247 A1* | 2/2015 | Kajarekar et al. | 348/484 |

OTHER PUBLICATIONS

A. Haubold; Indexing and Browsing Unstructured Videos using Visual, Audio, Textual, and Facial Cues; Columbia University, New York, NY; http://www.aquaphoenix.com.

Liu et. al.; Major Cast Detection in Video Using Both Speaker and Face Information; IEEE Transactions on Multimedia, vol. 9., No. 1, Jan. 2007.

Anzalone et al.; Audio-video People Recognition System for an Intelligent Environment; HSI, 2011 4th International Conference; May 19-21, 2011; ISBN 978-1-4244-9638-9.

Minotto et al.; Audiovisual Voice Activity Detection Based on Microphone Arrays and Color Information; IEEE JSTSP (vol. 7, Issue 1), Feb. 2013; pp. 147-156.

* cited by examiner

METHOD AND APPARATUS FOR USING FACE DETECTION INFORMATION TO IMPROVE SPEAKER SEGMENTATION

TECHNICAL FIELD

The disclosure relates generally to media processing. More particularly, the disclosure relates to detecting faces in video images and using information relating to the number of detected faces to improve an audio-based speaker segmentation process.

BACKGROUND

Video conferences, which include audio and visual components, are increasingly used as a way to facilitate meetings and to share information during the meetings. Typically, audio-based speaker segmentation is performed on audio components of a video conference to identify different speakers, e.g., to extract meta-data associated with speakers in a conference. Often, fluctuations in a voice of a single speaker may be attributed by an audio-based speaker segmentation algorithm to more than the single speaker, as extrinsic factors may affect the performance of the audio-based speaker segmentation algorithm. By way of example, extrinsic variations such as head movement of a speaker, movement of the speaker with respect to a microphone, and/or background noise may have an adverse effect on the accuracy with which an audio-based speaker segmentation algorithm performs.

BRIEF DESCRIPTION OF THE DRAWINGS

The disclosure will be readily understood by the following detailed description in conjunction with the accompanying drawings in which.

DESCRIPTION OF EXAMPLE EMBODIMENTS

General Overview

According to one aspect, a method includes obtaining media that includes a video stream and an audio stream. The method also includes detecting a number of faces visible in the video stream, and performing a speaker segmentation on the media. Performing the speaker segmentation on the media includes utilizing the number of faces visible in the video stream to augment the speaker segmentation.

Description

An audio-based speaker segmentation process performed on media, e.g., media that includes an audio signal and a video signal, may be improved by utilizing face detection information and/or clustering information. That is, the quality of audio-based speaker segmentation may be enhanced through the use of video information. For example, information relating to a number of faces detected in a video signal or a video component of media may be used to improve the accuracy with which an overall speaker segmentation process is performed. As will be appreciated by those skilled in the art, an overall speaker segmentation process generally involves detecting points in an audio signal or component at which speakers change, and identifying unique speakers in the media. In other words, speaker segmentation typically involves speaker change point detection. Homogenous segments may be substantially produced once speaker change points are detected. The homogenous segments may be clustered to identify unique speakers in an audio stream.

In general, speaker segmentation refers to audio-based approaches to speaker segmentation. As will be appreciated by those skilled in the art, face recognition and face segmentation typically refers to video-based approaches to speaker segmentation. It should be understood, however, that speaker segmentation is not limited to including audio-based approaches to speaker segmentation and may, in some instances, refer to both audio-based approaches and video-based approaches.

When information relating to the number of faces present in a video stream is made available during an audio-based speaker segmentation process, the audio-based speaker segmentation process may effectively use that information to aid in accurately identifying how many speakers may be speaking in a corresponding audio stream. For instance, the number of faces present in a video stream may be counted, and the number of faces counted may be used to effectively constrain an audio-based speaker segmentation process by setting an upper bound on a number of speakers heard in a corresponding audio stream. As a result, the efficiency and accuracy with which speaker segmentation is performed may be improved. By way of example, when substantially all people present at a meeting are captured in a video stream, the efficiency and accuracy in which audio-based speaker segmentation is performed may be improved as the video stream may be analyzed using face detection to detect substantially all the people at the meeting, and the number of people at the meeting as captured in the video stream may be provided to an audio-based speaker segmentation algorithm.

In one embodiment, a face detection arrangement may provide both face clustering information and face change information that may be used by an audio-based speaker segmentation arrangement. A face detection arrangement may generally detect the presence of faces, and determine a number of faces detected. Face clustering information may indicate a number of faces associated with a collection of segments of media, and an audio-based speaker segmentation arrangement may use the face clustering information as a loose upper bound to the number of speakers in the corresponding collection of segments. Face change information, which may be interpreted as scene change information, may indicate when a number of faces associated with a particular segment of media has changed. The face change information may be used by an audio-based speaker segmentation arrangement to facilitate or to otherwise augment the identification of potential speaker changes.

Figure 1:
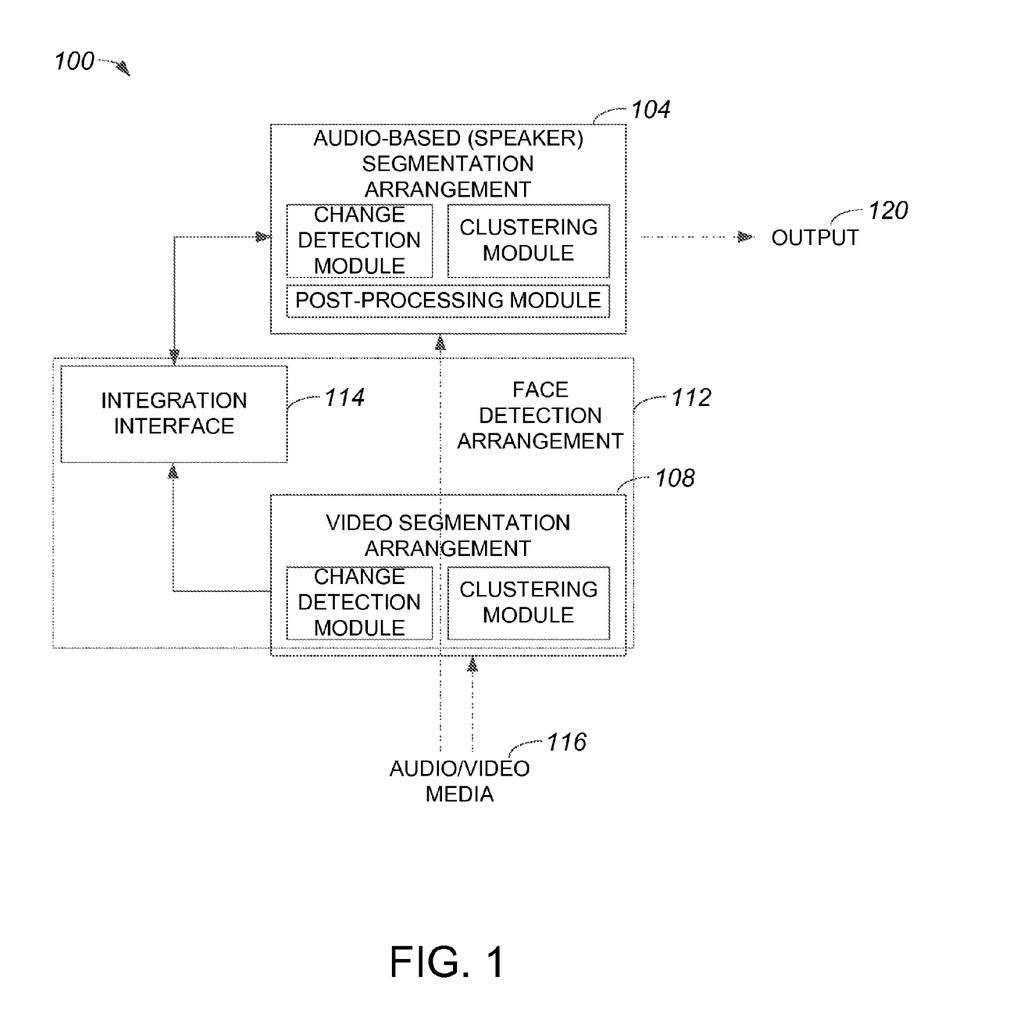
FIG. 1 is a diagrammatic representation of an overall system in which information identified using face detection is used to improve audio-based speaker segmentation in accordance with an embodiment.

Referring initially to FIG. 1, an overall system in which information identified using face detection is used to improve speaker segmentation will be described in accordance with an embodiment. An overall system 100 includes an audio segmentation arrangement 104 and a face detection arrangement 112. It should be appreciated that overall system 100 may be embodied on a single node, e.g., on a computer system, or may be embodied on different nodes, e.g., distributed throughout a network.

Audio segmentation arrangement 104 is generally arranged to perform speaker segmentation based on an audio component, or an audio stream, that is a part of media 116. Face detection arrangement 112 is generally arranged to perform speaker segmentation based on a video component, or a video stream, that is a part of media 116.

Face detection arrangement 112 includes a video segmentation arrangement 108 and an integration interface 114. Video segmentation arrangement 108 generally includes a clustering module which may identify a number of faces visible in the video component of media 116 and a change detection module which is configured to identify face changes in the video component of media 116. Integration interface 114 is configured to provide information relating to the number of faces visible in the video component of media 116, as well as information relating to any face changes in the video component of media 116, to audio segmentation arrangement 104.

In one embodiment, audio segmentation arrangement 104 is configured to process an audio component of media 116 using information obtained through integration interface 114 from video segmentation arrangement 108. An output 120 produced by audio segmentation arrangement 104 identifies changes in speakers within media 116. By way of example, if media 116 is a segment of video and audio recorded or otherwise obtained between a first time and a second time, output 120 may identify points within the segment at which speakers change between the first time and the second time.

Integration interface 114 may, in one embodiment, facilitate the combined operation of audio segmentation arrangement 104 and video segmentation arrangement 108. By way of example, audio segmentation arrangement 104 may detect changes in bandwidth associated with media 116, and may determine that a particular bandwidth is generally associated with speakers using a telephone. As such, audio segmentation arrangement 104 may determine that a speaker is speaking on a telephone and not visible in a video component of media 116. Therefore, information obtained through interface 114 from video segmentation arrangement 108 may essentially be ignored by audio segmentation arrangement 104 as a speaker speaking on a telephone will not be detected by video segmentation arrangement 108.

The combined operation of audio segmentation arrangement 104 and video segmentation arrangement 108 may also allow a determination to be made as to whether information obtained from video segmentation arrangement 108 is to effectively be weighted more highly than information obtained from audio segmentation arrangement 104. For example, when an audio component of media 116 includes a relatively large amount of ambient noise, information obtained from video segmentation arrangement 108 may be associated with a higher weight in terms of segmentation confidence.

Figure 2:
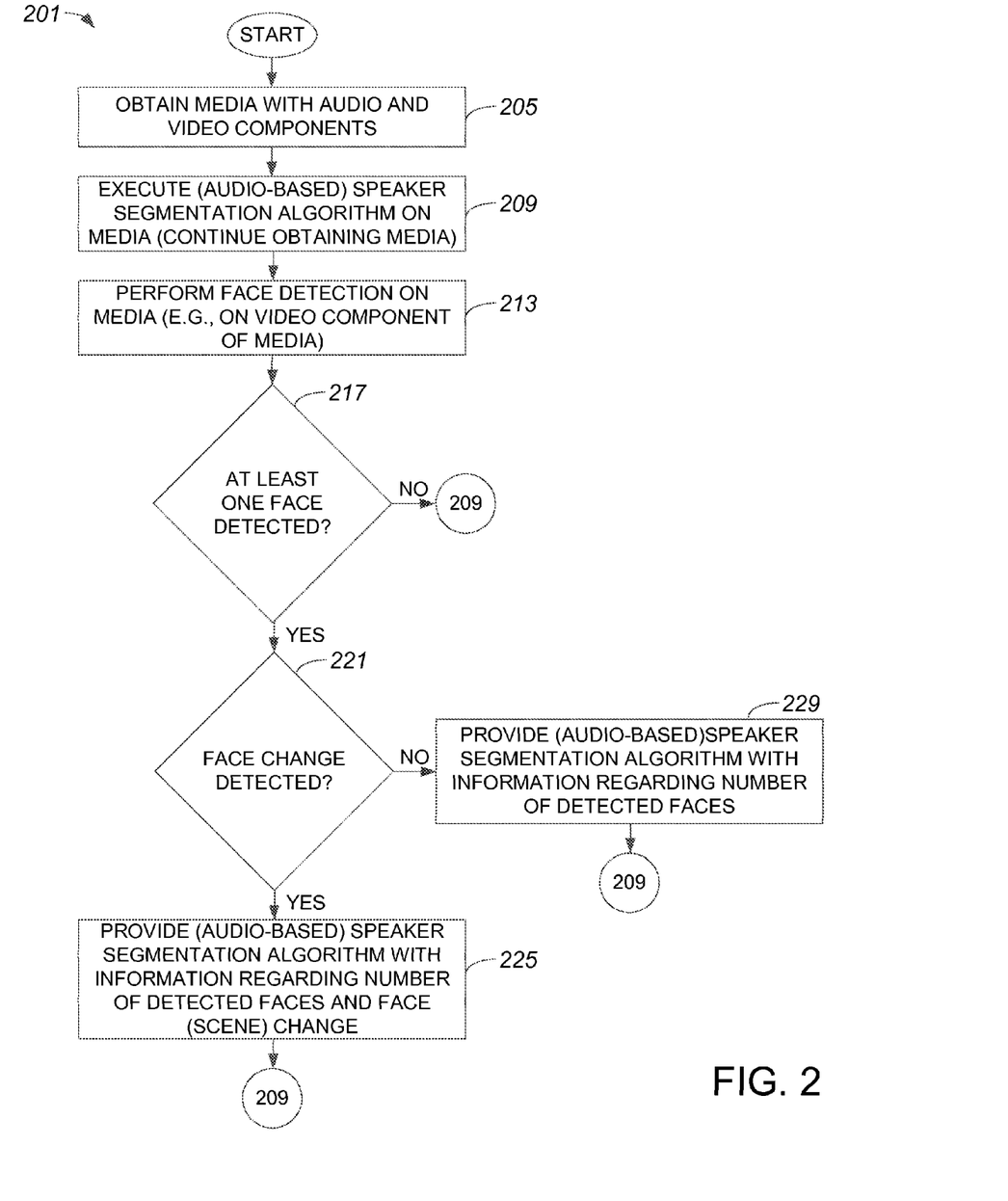
FIG. 2 is a process flow diagram which illustrates which illustrates a method of processing media such that face detection information may be provided to an audio-based speaker segmentation algorithm in accordance with an embodiment

With reference to FIG. 2, a process flow diagram which illustrates a method of processing media such that face detection information may be provided to a speaker segmentation algorithm will be described in accordance with an embodiment. A method 201 of processing media begins at step 205 in which media that includes audio and video streams, or components, is obtained. The media may be, for example, a video clip that includes sound. In one embodiment, the media may be a segment of a recording of a conference session that includes a video stream and an audio stream which are each recorded between a first time and a second time.

Once the media is obtained, a speaker segmentation algorithm, e.g., an audio-based speaker segmentation algorithm, is initiated in step 209 with respect to the media. In other words, a process that clusters speakers and/or identifies changes of speakers is applied to the media. It should be appreciated that throughout the processing of media, media is substantially continuously obtained. That is, media with audio and video components continues to be obtained during the overall processing of media.

In step 213, face detection is performed on the media. That is, face detection is performed on the video component to determine how many faces are in the video component. It should be appreciated that any suitable face detection algorithm may generally be used to determine a number of faces portrayed in the video component. In one embodiment, face detection may be performed on at least one frame associated with the media to determine a number of faces in the frame. Face detection may be performed on the media, for example, substantially only when a change is detected. A scene change may be, but is not limited to being, a significant change in the content of a video frame relative to the content of a previous video frame. A face count may be performed on any number of frames, i.e., one or more frames, to effectively ensure that substantially all possible faces may be detected. By way of example, a single frame may be analyzed, a series of X consecutive frames may be analyzed, and/or one frame out of every Y frames may be analyzed.

A determination is then made in step 217 to ascertain whether at least one face is detected in the media. If it is determined that at least one face is not detected, then process flow returns to step 209 in which a speaker segmentation algorithm continues to be executed as media is obtained.

Alternatively, if it is determined in step 217 that at least one face has been detected in the media, it is then determined in step 221 as to whether a face change has been detected. It should be appreciated that when there is a face change may be interpreted as a scene change. Thus, when there is a face change or a scene change, information associated with the change may be used to provide a starting point for a process of identifying a change in audio.

If the determination in step 221 is that a face change has been detected, then the speaker segmentation algorithm is provided with information regarding a number of detected faces, as well as information indicating a face, or scene, change in step 225. From step 225, process flow returns to step 209 in which a speaker segmentation algorithm continues to execute, while augmented with the number of detected faces, as media is obtained.

Returning to step 221, if the determination is that a face change has not been detected, the speaker segmentation algorithm is provided with information regarding a number of detected faces in step 229. After the information regarding the number of detected faces is provided to the speaker segmentation algorithm, process flow returns to step 209 in which a speaker segmentation algorithm continues to execute as media is obtained.

Figure 3:
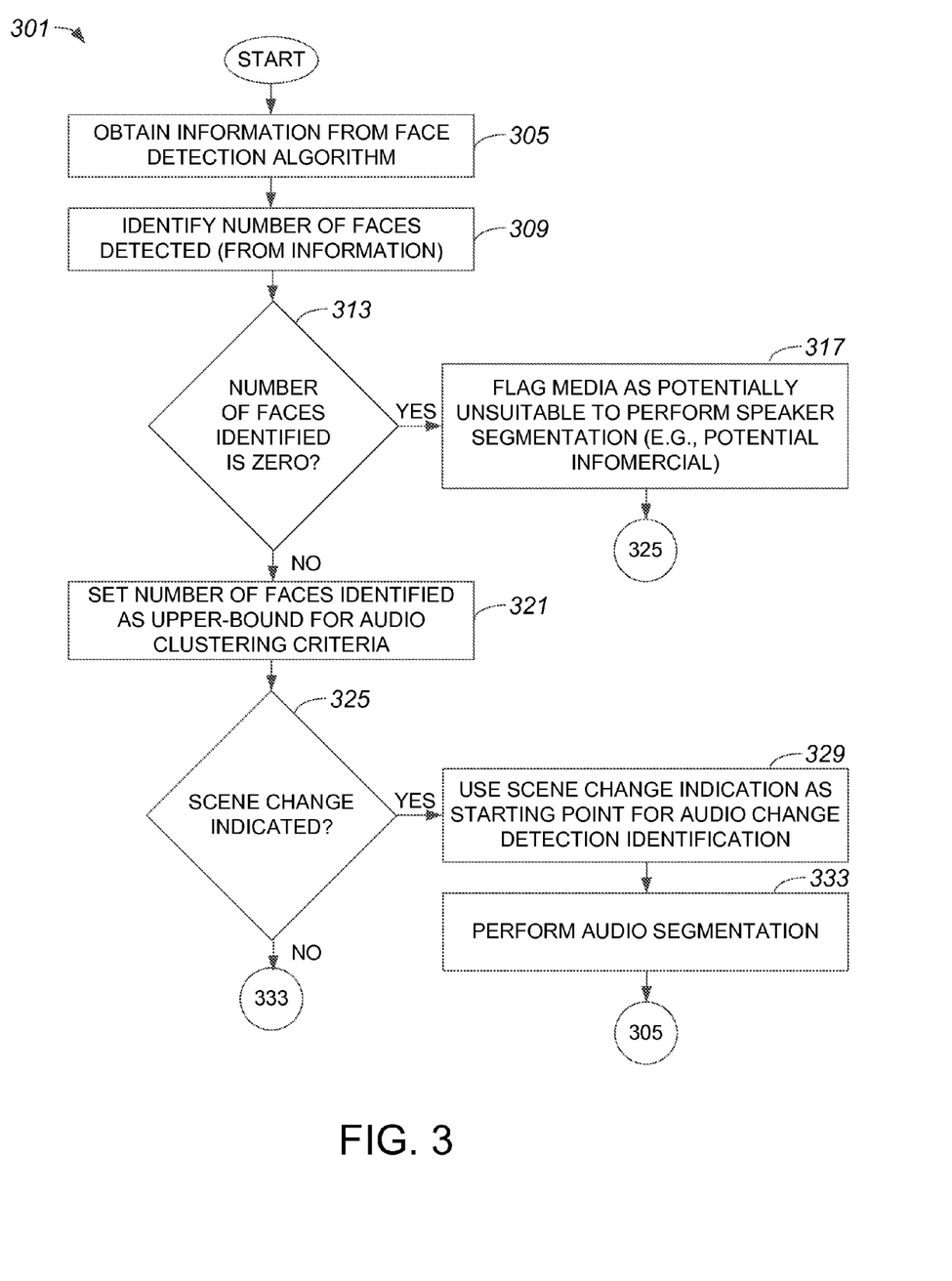
FIG. 3 is a process flow diagram which illustrates a method of executing an audio-based speaker segmentation algorithm which uses face detection information in accordance with an embodiment.

FIG. 3 is a process flow diagram which illustrates a method of executing a speaker segmentation algorithm which uses face detection information in accordance with an embodiment. A method 301 of executing a speaker segmentation algorithm begins at step 305 in which a speaker segmentation algorithm, e.g., an algorithm executed by a speaker segmentation arrangement of a node, obtains information from a face detection algorithm, e.g., an algorithm executed by a face detection arrangement of the node. A node which includes a speaker segmentation arrangement and a face detection arrangement will be discussed below with reference to FIG. 4. It should be appreciated that the information obtained from the face detection algorithm corresponds to media that is effectively being processed by the speaker segmentation algorithm.

The information obtained in step 305 generally indicates a number of faces detected or otherwise identified in media, e.g., a number of faces detected in a video component of the media. In step 309, the speaker segmentation algorithm identifies the number of faces detected by parsing the information. It should be appreciated that in addition to identifying the number of faces indicated in the information, the speaker segmentation algorithm may also weight the number of faces in terms of segmentation confidence, e.g., a number of faces may be weighted higher when an audio component of the media exhibits relatively significant noise.

It is determined in step 313 whether the number of faces identified is zero. That is, it is determine whether any faces were detected by a face detection algorithm. If the determination in step 313 is that the number of faces identified is zero, then the media is flagged in step 317 as potentially being unsuitable for speaker segmentation. For example, the media may be flagged as potentially being an infomercial when there are no detected faces in the media, as well as where there are excessively frequent scene changes. It should be appreciated that although speakers may speak in the media, such speakers may not be visually represented in the media, e.g., when the speakers are participating remotely in a conference call. In the described embodiment, when no faces are identified in the media, the media may be identified as potentially unsuitable to perform speaker segmentation.

After the media is flagged in step 317 as potentially having no speech, process flow proceeds to step 325 in which it is determined whether a scene change is indicated. If it is determined that a scene change is not indicated, audio segmentation is performed in step 333. As previously mentioned, a scene change may generally be associated with a face change, or a change in a number of faces detected, and information relating to a scene change may be used to facilitate the identification of a potential speaker change. Process flow then returns to step 305 in which information is obtained from a face detection algorithm.

Alternatively, if the determination in step 325 is that a scene change is indicated, the scene change indication is used in step 329 as a starting point for an audio change detection identification. Once the starting point is set, process flow proceeds to step 333 in which audio segmentation is performed.

Returning to step 313, if it is determined that the number of faces identified is not zero, then the number of faces identified is set as an upper-bound for audio clustering criteria in step 321. Once the upper-bound for the audio clustering criteria is set, a determination is made in step 325 as to whether a scene change is indicated.

Figure 4:
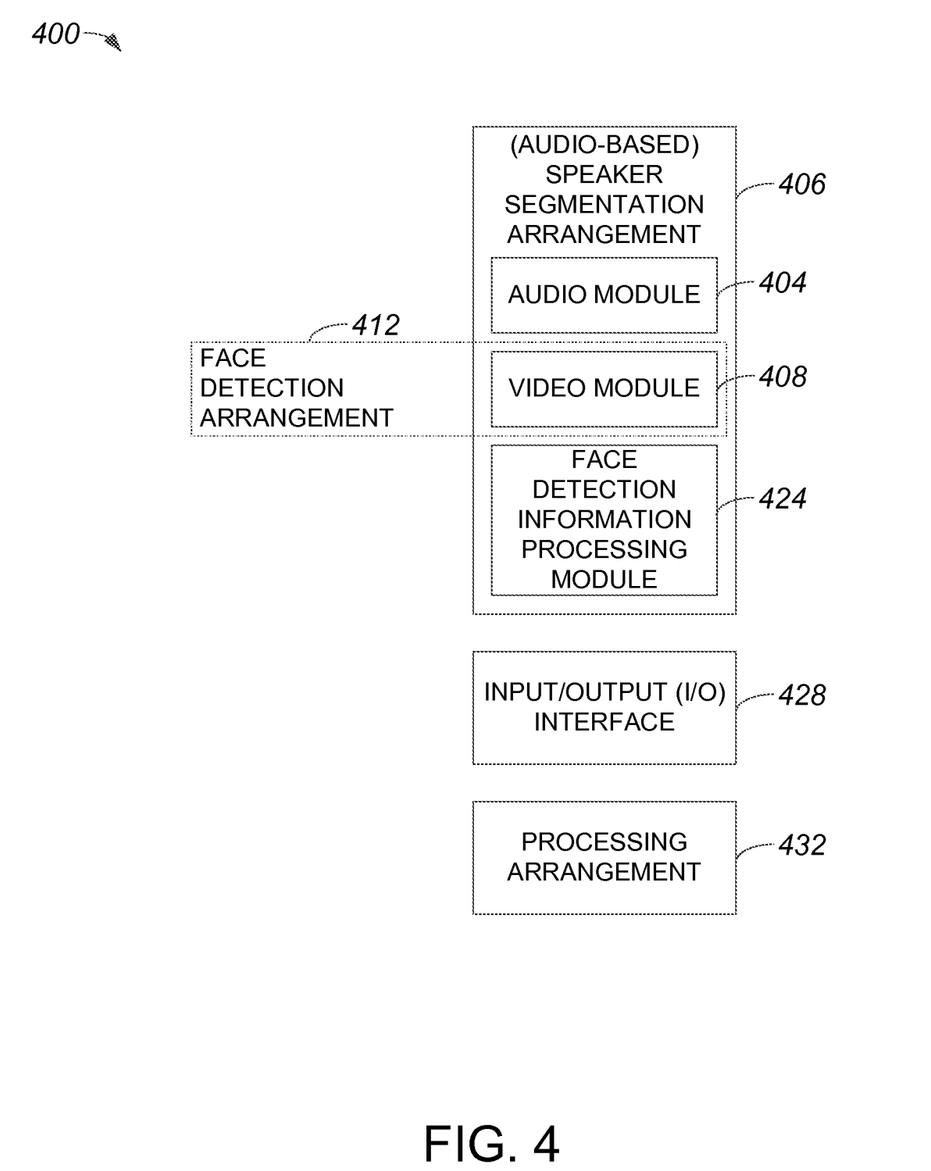
FIG. 4 is a block diagram representation of a node, e.g., a computing system, that performs speaker segmentation using information provided using face detection in accordance with an embodiment.

With reference to FIG. 4, a node, e.g., a computing system, which is configured to perform speaker segmentation using information provided using face detection will be described in accordance with an embodiment. A node 400 includes a speaker segmentation arrangement 406, a face detection arrangement 412, an input/output (I/O) interface 428, and a processing arrangement 432. In general, speaker segmentation arrangement 406 and face detection arrangement 412 may be hardware and/or software modules arranged to be executed by processing arrangement 432.

Speaker segmentation arrangement 406 includes an audio module 404, a video module 408, and a face detection information processing module 424. Audio module 404 is arranged to process an audio signal or stream to identify points in the audio signal at which speakers change. Video module 408, which is a part of face detection arrangement 412, is arranged to process a video signal or stream to identify a number of speakers shown in the video signal, as well as to identify face changes. Face detection information processing module 424 is configured to process information obtained from face detection arrangement 412, and to provide such information to audio module 404.

I/O interface 428 is configured to obtain media on which speaker segmentation is to be performed. By way of example, I/O interface 428 may include at least one port on which media that includes audio and video components may be obtained over a network. It should be understood that media is not limited to being obtained through I/O interface 428. Media may also be obtained, for example, from a storage arrangement (not shown) that is part of node 400.

Figure 5:
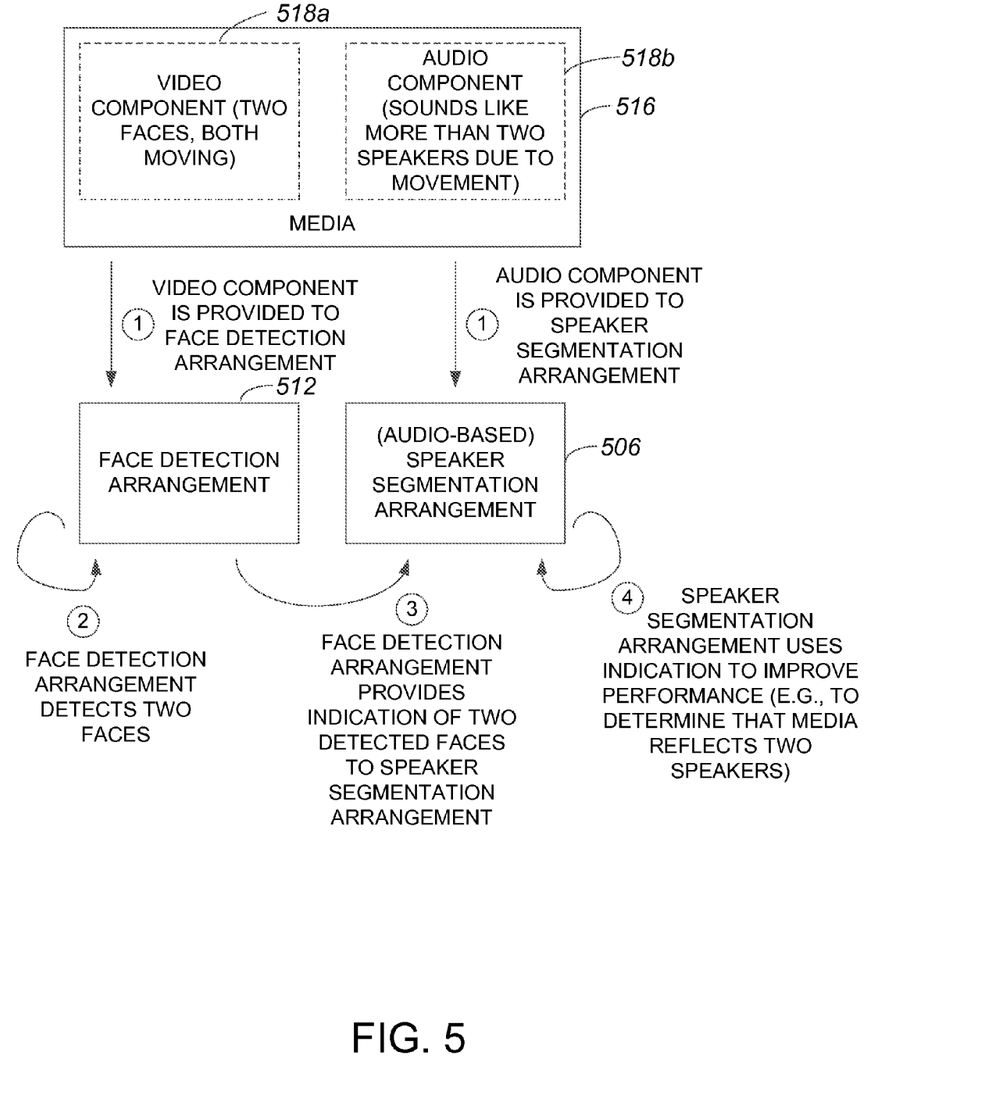
FIG. 5 is a diagrammatic representation of a process of performing speaker segmentation on media in which two moving speakers are present in accordance with an embodiment.

The ability to utilize face detection information to improve a speaker segmentation process may be particularly useful when media includes moving speakers. When a speaker moves such that a relative distance between the speaker and a microphone changes, the speaker may essentially sound like more than one speaker. By using face detection information, the likelihood that a moving speaker is accurately identified as a single speaker may be improved. FIG. 5 is a diagrammatic representation of a process of performing speaker segmentation on media in which two moving speakers are present in accordance with an embodiment. Media 516 includes a video component 518a and an audio component 518b. In the described embodiment, video component 518a depicts two faces which are moving and audio component 518b represents the voices of individuals portrayed by the two faces. That is, media 516 is such that two individuals are visible in video component 518a and heard in audio component 518b.

When speaker segmentation is to be performed, video component 518a is provided to a face detection arrangement 512. At substantially the same time, audio component 518b is provided to a speaker segmentation arrangement 506, e.g., an audio-based speaker segmentation arrangement. Face detection arrangement 512 may process video component 518a, and may identify two moving faces, or two people, depicted in video component 518a. Face detection arrangement 512 is not arranged to determine the identities of the two moving faces, or the two people, but is arranged to determine that there are two people shown in video component 518a. In other words, face detection arrangement 512 identifies a number of faces in video component 518a, but not the identities of the faces.

Upon detecting two faces in video component 518a, face detection arrangement 512 provides speaker segmentation arrangement 506 which an indication that two faces were detected in video component 518a. Once speaker segmentation arrangement 506 obtains the indication from face detection arrangement 512, speaker segmentation arrangement 506 uses the indication to improve its performance. That is, speaker segmentation arrangement 506 uses the indication to effectively restrict an expected number of speakers to two, as the indication provides knowledge that there are two faces detected with respect to media 516. Thus, although audio component 518b may appear to contain more than two speakers due to movement of the two speakers, speaker segmentation arrangement 506 is able to use the indication provided by face detection arrangement 512 to determine that media 516 includes voices associated with two speakers.

Although only a few embodiments have been described in this disclosure, it should be understood that the disclosure may be embodied in many other specific forms without departing from the spirit or the scope of the present disclosure. By way of example, while media may generally be recorded media, the media is not limited to being recorded media. The media may, in one embodiment, be obtained and processed substantially in real time.

When recorded media includes one audio participant, e.g., a conference participant who is participating via a telephone, and one audio/video participant, a system that records the media may be such that when the audio participant is speaking, the video recorded may show a particular icon. In one embodiment, when the particular icon is displayed in the recorded media, a face detection algorithm may determine that the recorded media includes audio only while the particular icon is displayed. In addition, it should be appreciated that when an audio stream has a bandwidth indicative of a speaker speaking on a telephone, e.g., at a bandwidth of approximately sixteen kilohertz (KHz), it may effectively be inferred that a corresponding video stream will not capture the speaker.

As will be appreciated by those skilled in the art, some media may be recorded using applications which use spatial correlation and/or tracking, e.g., face tracking and/or voice tracking. For such media, there may be a relatively high number of face changes detected. In one embodiment, an indication of a face change may be provided to a speaker segmentation algorithm substantially only for significant scene changes. A scene change may be considered to be significant, for instance, when there is a change of cameras used to capture video associated with a multi-party meeting. It should be understood, however, that parameters associated with a speaker segmentation algorithm may effectively be tuned or otherwise set to define what is considered to be a significant scene change.

Performing speaker segmentation may involve a clustering process. A clustering process typically includes grouping audio or speech segments of media based on characteristics of speakers. In one embodiment, a clustering process may use information provided by a face detection process.

While a face detection process has generally been described as providing a number of faces detected in a video component of media to an audio-based speaker segmentation algorithm, it should be appreciated that a number of faces is not limited to being detected and provided by a face detection process. Information which relates to a number of detected faces in a video component of media may be obtained using any suitable method. In one embodiment, a face recognition algorithm may be used to effectively provide face detection information, or a number of faces detected in a video component of media. By way of example, when a face recognition algorithm determines the identities, or names, of two people captured in a video component of media, information which indicates that two people were identified in the video component may be provided to an audio-based speaker segmentation algorithm. That is, information which indicates that two people were effectively detected, and not the identities of the two people, may be provided to an audio-based speaker segmentation algorithm by a face recognition algorithm The embodiments may be implemented as hardware, firmware, and/or software logic embodied in a tangible, i.e., non-transitory, medium that, when executed, is operable to perform the various methods and processes described above. That is, the logic may be embodied as physical arrangements, modules, or components. A tangible medium may be substantially any computer-readable medium that is capable of storing logic or computer program code which may be executed, e.g., by a processor or an overall computing system, to perform methods and functions associated with the embodiments. Such computer-readable mediums may include, but are not limited to including, physical storage and/or memory devices. Executable logic may include, but is not limited to including, code devices, computer program code, and/or executable computer commands or instructions.

It should be appreciated that a computer-readable medium, or a machine-readable medium, may include transitory embodiments and/or non-transitory embodiments, e.g., signals or signals embodied in carrier waves. That is, a computer-readable medium may be associated with non-transitory tangible media and transitory propagating signals.

The steps associated with the methods of the present disclosure may vary widely. Steps may be added, removed, altered, combined, and reordered without departing from the spirit of the scope of the present disclosure. Therefore, the present examples are to be considered as illustrative and not restrictive, and the examples is not to be limited to the details given herein, but may be modified within the scope of the appended claims.

What is claimed is:

1. A method comprising:
   obtaining media, the media including a video stream and an audio stream through an input/output (I/O) interface of a computing system;
   detecting a number of faces visible in the video stream; and
   performing a speaker segmentation on the media, wherein performing the speaker segmentation includes utilizing the number of faces visible in the video stream to augment the speaker segmentation, the speaker segmentation being performed by the computing system.

2. The method of claim 1 further including:
   determining whether there is a face change associated with the video stream, wherein performing the speaker segmentation further includes obtaining an indication of the face change and utilizing the indication of the face change.

3. The method of claim 2 wherein performing the speaker segmentation on the media includes setting an upper-bound for an audio clustering criterion to be approximately equal to the number of faces detected in the video stream.

4. The method of claim 3 wherein performing the speaker segmentation on the media further includes performing an audio change detection identification, and wherein when it is determined that there is the face change associated with the video stream, performing the audio change detection identification includes setting the indication of the face change as a starting point for the audio change detection identification.

5. The method of claim 1 further including:
   determining a level of noise associated with the audio stream, wherein performing the speaker segmentation on the media further includes weighting an importance of the number of faces as used in performing the speaker segmentation based on the level of noise.

6. A tangible, non-transitory computer-readable medium comprising computer program code, the computer program code, when executed, configured to:
   obtain media, the media including a video stream and an audio stream;
   detect a number of faces visible in the video stream; and perform a speaker segmentation on the media, wherein the computer program code configured to perform the speaker segmentation includes computer program code operable to utilize the number of faces visible in the video stream to augment the speaker segmentation.

7. The tangible, non-transitory computer-readable medium comprising computer program code of claim 6 wherein the computer program code is further configured to:
determine whether there is a face change associated with the video stream, wherein the computer program code configured to perform the speaker segmentation further includes computer program code configured to obtain an indication of the face change and to utilize the indication of the face change.

8. The tangible, non-transitory computer-readable medium comprising computer program code of claim 7 wherein the computer program code configured to perform the speaker segmentation on the media is further configured to set an upper-bound for an audio clustering criterion to be approximately equal to the number of faces detected in the video stream.

9. The tangible, non-transitory computer-readable medium comprising computer program code of claim 8 wherein the computer program code configured to perform the speaker segmentation on the media is further configured to perform an audio change detection identification, and wherein when it is determined that there is the face change associated with the video stream, the computer program code configured to perform the audio change detected identification is further configured to set the indication of the face change as a starting point for the audio change detection identification.

10. The tangible, non-transitory computer-readable medium comprising computer program code of claim 6 wherein the computer program code is further configured to:
determine a level of noise associated with the audio stream, wherein the computer program code configured to perform the speaker segmentation on the media is further configured to weight an importance of the number of faces as used in performing the speaker segmentation based on the level of noise.

11. An apparatus comprising:
a face detection arrangement, the face detection arrangement being configured to process a video component of media to identify a number of faces in the video component; and
a speaker segmentation arrangement, the speaker segmentation arrangement being configured to process an audio component of the media to identify a speaker change in the audio component, wherein the speaker segmentation arrangement is configured to use the number of faces in the video component when processing the audio component to identify the speaker change; and
a processor, wherein the face detection arrangement and the speaker segmentation arrangement are embodied as logic on a tangible, non-transitory computer-readable medium, and wherein the logic is arranged to be executed by the processor.

12. The apparatus of claim 11 wherein the video component and the audio component are part of a first segment of the media, the first segment of the media having a start point and an end point, and wherein the speaker change is a point between the start point and the end point.

13. The apparatus of claim 11 wherein the face detection arrangement is further configured to process the video component to determine whether the video component includes a face change, wherein when it is determined that the video component includes the face change, the speaker segmentation arrangement is further configured to use information associated with the face change to identify the speaker change.

14. The apparatus of claim 13 wherein the speaker segmentation arrangement is configured to perform an audio change detection identification and wherein the information associated with the face change is set a starting point for the audio change detection identification.

15. The apparatus of claim 11 wherein the speaker segmentation arrangement is configured to set at least one audio clustering criterion, and wherein the number of faces in the video component is set as an upper-bound for the at least one audio clustering criterion.

16. The apparatus of claim 11 wherein when the number of faces in the video is zero, the speaker segmentation arrangement is configured to identify the media as potentially containing no speech.

17. The apparatus of claim 11 further including:
an input/output (I/O) interface, the I/O interface being arranged to obtain the media.

\* \* \* \* \*